(12) United States Patent
Clemens

(10) Patent No.: US 8,122,697 B1
(45) Date of Patent: Feb. 28, 2012

(54) LEAF CUTTING APPARATUS

(75) Inventor: Jacob Edward Clemens, Harleysville, PA (US)

(73) Assignee: Leaf Harvest, LLC, Harleysville, PA (US)

( * ) Notice: Subject to any disclaimer, the term of this patent is extended or adjusted under 35 U.S.C. 154(b) by 0 days.

(21) Appl. No.: 12/732,648

(22) Filed: Mar. 26, 2010

Related U.S. Application Data

(60) Provisional application No. 61/163,923, filed on Mar. 27, 2009.

(51) Int. Cl.
*A01D 34/53* (2006.01)

(52) U.S. Cl. .......................... 56/249; 56/16.6

(58) Field of Classification Search ............ 56/16.4 R, 56/16.4 D, 16.6, 199, 200, 202, 251; 241/56, 241/73, 101.762, 101.78; 30/388, 516, 276; 83/100; 15/340.1–340.4, 330
See application file for complete search history.

(56) References Cited

U.S. PATENT DOCUMENTS

| | | | |
|---|---|---|---|
| 1,768,713 A * | 7/1930 | Prater ............................. 241/73 |
| 2,291,815 A * | 8/1942 | Korum ........................ 241/88.3 |
| 2,517,184 A * | 8/1950 | Elliott et al. .................... 56/249 |
| 2,599,883 A * | 6/1952 | Aske ............................. 56/249 |
| 2,822,846 A | 2/1958 | Ward |
| 2,979,879 A | 4/1961 | Reynolds et al. |
| 3,326,477 A * | 6/1967 | Demetrovits ................... 241/60 |
| 3,419,223 A * | 12/1968 | Morin ............................ 241/73 |
| 3,732,674 A | 5/1973 | Guillory |
| 3,895,481 A * | 7/1975 | Olney et al. .................... 56/17.5 |
| 3,925,968 A * | 12/1975 | Wagenhals ..................... 56/13.3 |
| 3,958,401 A * | 5/1976 | Carpenter ....................... 56/202 |
| 4,095,398 A * | 6/1978 | Aumann et al. ................ 56/202 |
| 4,308,997 A * | 1/1982 | Valco ............................. 241/47 |
| 4,532,755 A * | 8/1985 | Schemelin et al. ............ 56/16.6 |
| 4,682,740 A | 7/1987 | Conigliaro et al. |
| 4,738,088 A * | 4/1988 | Klever et al. ................... 56/202 |
| 4,778,117 A | 10/1988 | Karg |
| 4,960,247 A | 10/1990 | Lundell |
| 4,986,063 A * | 1/1991 | Eggenmuller ................. 56/16.6 |
| 5,018,672 A | 5/1991 | Peck et al. |
| 5,020,309 A * | 6/1991 | Hopkins ........................ 56/13.3 |
| 5,048,279 A | 9/1991 | Badawey et al. |
| 5,085,375 A | 2/1992 | Haworth |
| 5,240,188 A * | 8/1993 | Whitmire ........................ 241/29 |
| 5,400,576 A * | 3/1995 | Smith ............................. 56/249 |
| 5,485,715 A * | 1/1996 | Breeden ......................... 56/13.3 |
| 5,622,320 A * | 4/1997 | Hubbard et al. ............... 241/56 |
| 5,626,008 A | 5/1997 | Puszkar |
| 6,062,013 A | 5/2000 | Wolske |

(Continued)

OTHER PUBLICATIONS

Mulcher Built from Old Reel type Lawn Mower HowTo Plans—eBay dated Mar. 7, 2008 (3 pages).

(Continued)

*Primary Examiner* — Thomas Will
*Assistant Examiner* — Joan Misa
(74) *Attorney, Agent, or Firm* — Rader, Fishman & Grauer PLLC

(57) ABSTRACT

An apparatus includes a cover defining an interior chamber, a cutting box, the cover being mounted on the cutting box. A blade reel assembly is disposed within the cutting box, the blade reel assembly including at least one blade, and being configured to rotate about an axle. A cutting bar is disposed adjacent to a circumference defined by the at least one blade. A mesh screen is disposed beneath the blade reel assembly, proximate to the circumference.

20 Claims, 8 Drawing Sheets

U.S. PATENT DOCUMENTS 6,595,442 B1    7/2003   Green et al.
6,910,648 B1 *  6/2005   Reinhold ........................ 241/92
7,121,071 B2   10/2006   Berkeley
7,654,480 B2 *  2/2010   Baer et al. ...................... 241/36

OTHER PUBLICATIONS

Electric Leaf Shredder from www.cleanairgardening.com/leafshredder.html dated Mar. 7, 2008 (3 pages).

* cited by examiner

LEAF CUTTING APPARATUS

RELATED APPLICATION

This application claims priority to provision patent application Ser. No. 61/163,923, filed Mar. 27, 2009, the contents of which are fully incorporated herein by reference in their entirety.

BACKGROUND INFORMATION

In areas with many trees, particularly areas with changing seasons and deciduous trees, collection and disposal of leave presents an outgoing, or at least an annual, problem. Present mechanisms for collecting and disposing of leaves may not allow for leaves to be processed as efficiently as possible.

SUMMARY OF THE DRAWING FIGURES

DISCLOSURE OF PREFERRED EMBODIMENTS

Figure 1:
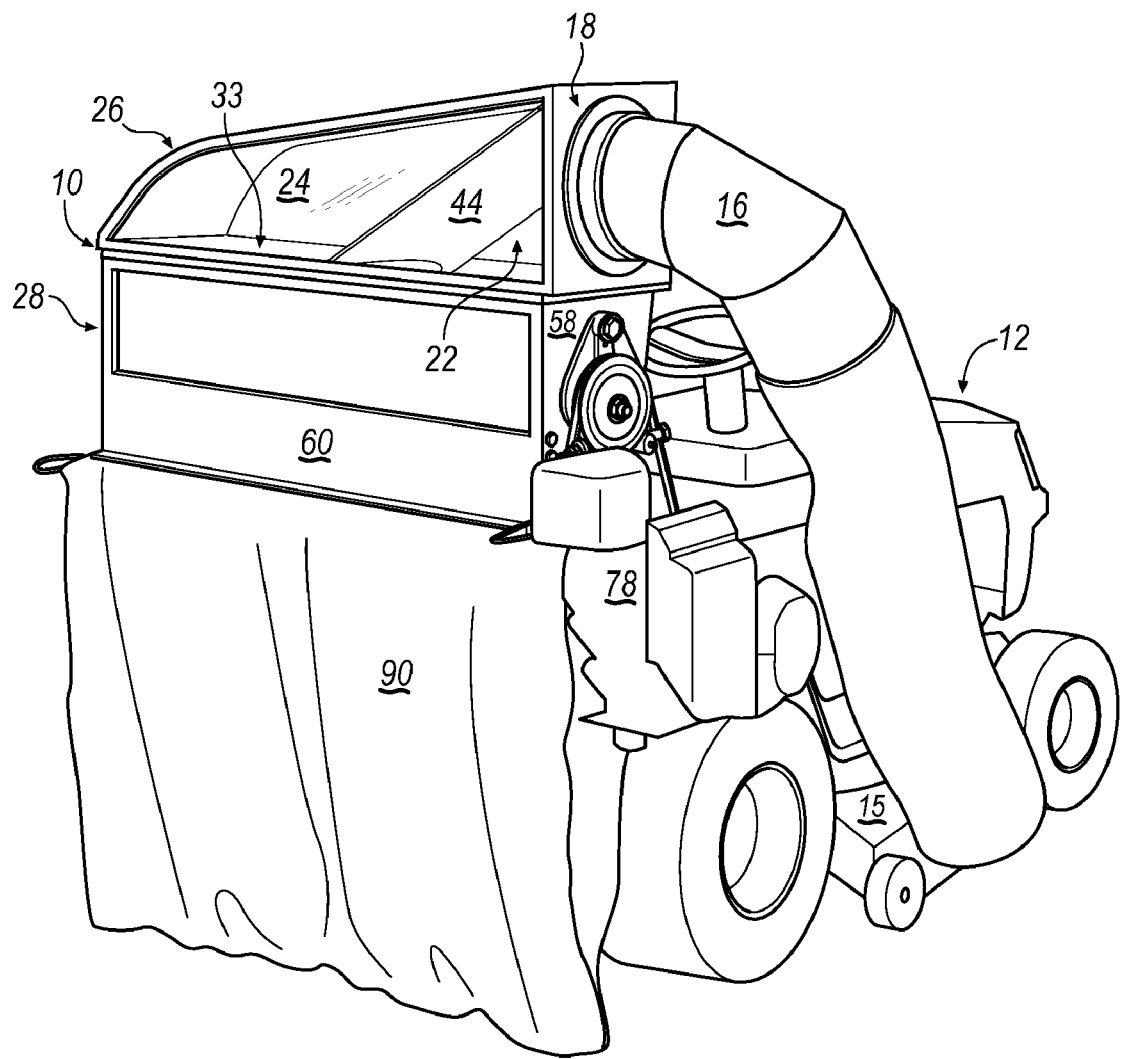
FIG. 1 illustrates an exemplary leaf cutter mounted on a lawn tractor.

FIG. 1 illustrates an exemplary leaf cutter 10 mounted on a lawn tractor 12. The leaf cutter may be mounted on or attached to a vehicle such as the tractor 12 via a variety of mechanisms, such as a frame 62 (FIG. 2.) that supports the leaf cutter 10 and that is attached to the vehicle, e.g., via bolts, welds, or other available fastening mechanisms.

Referring to FIG. 1, a hose 14 runs from a mowing chamber 15 of lawn tractor 12 to an inlet pipe 16 that is formed, e.g., welded, in an articulated manner, as can be seen in FIG. 1. Now also referring to FIG. 2, pipe 16 is in turn attached to an inlet plate 18 having an opening 20 leading to an inlet area 22 of an interior chamber 24 of leaf cutter 10. For example, the pipe 16 may be welded to the plate 18, or may be attached in some other manner; for example, although not shown in the figures, pipe 16 could include flanges to could be fitted to lip portions welded to plate 18, or some other manner of affixing pipe 16 to plate 18 could be employed.

Hose 14, inlet pipe 16, and the opening 20 in inlet plate 18 generally have diameters that are substantially the same. For example, the diameters of hose 14, pipe 16, and the opening in plate 18 may be approximately eight inches. Other diameters are possible, bearing in mind that if the diameter of hose 14, pipe 16, and the opening 20 should be large enough to avoid leaves from clogging hose 14, pipe 16, or the opening 20, but small enough so that leaves are blown from the mowing chamber of lawn tractor 12 to leaf cutter 10 under sufficient pressure.

Figure 2:
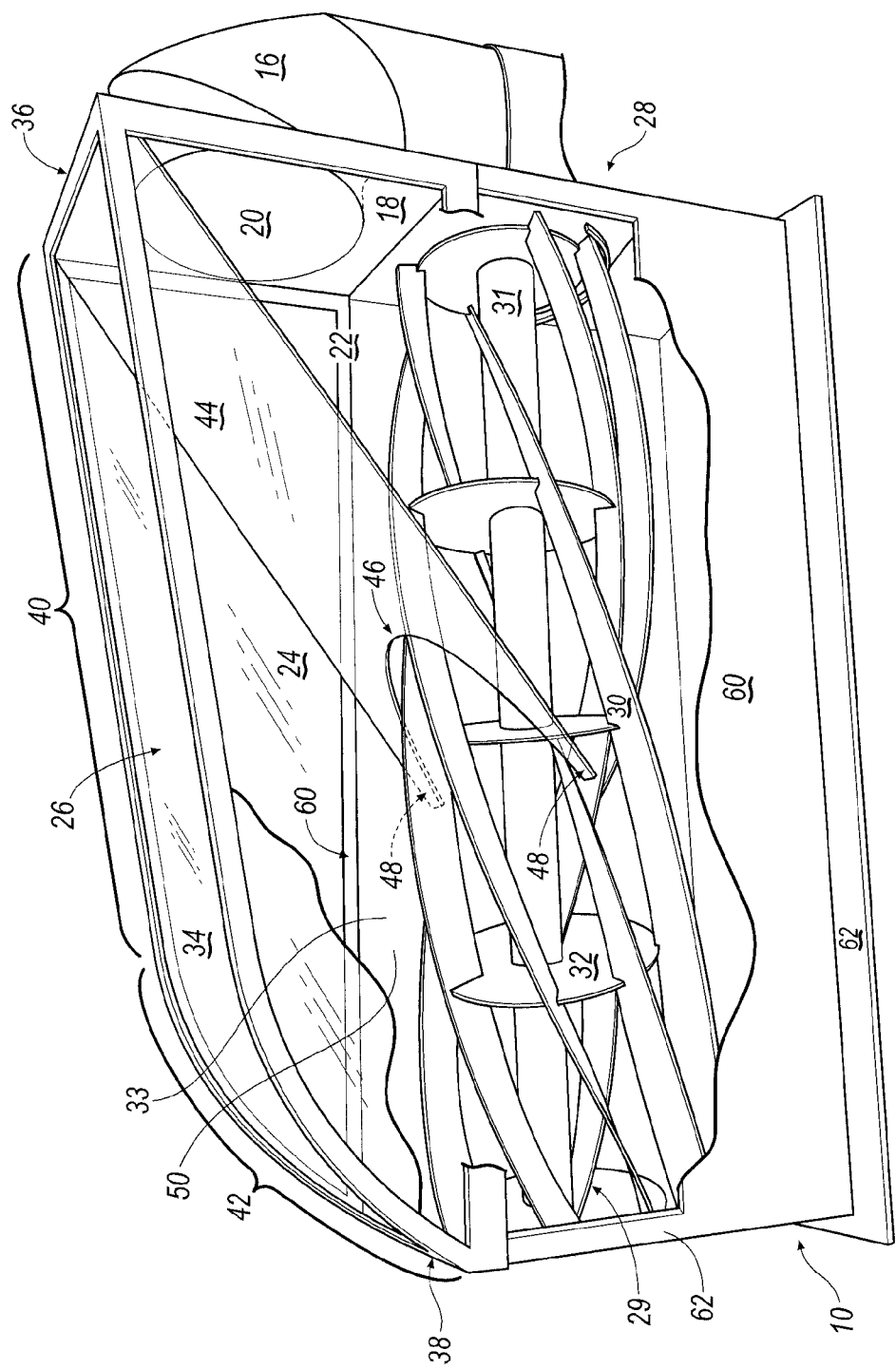
FIG. 2 is an exemplary perspective of the leaf cutter of FIG. 1.
Figure 3:
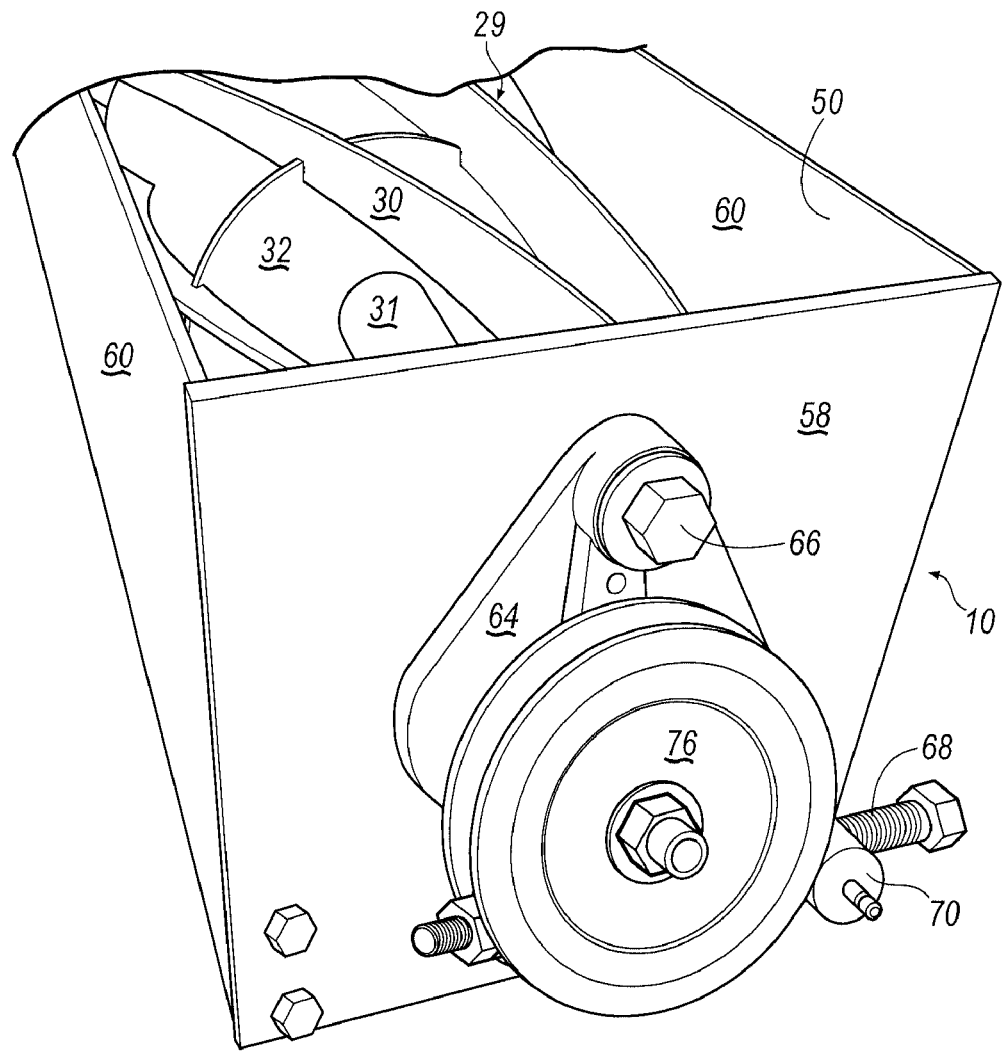
FIG. 3 is a top/side view of a portion of the leaf cutter of FIG. 1.

A cover 26 is mounted atop a generally rectangular cutting box 28, thereby defining the interior chamber 24. The cover 26 may be formed of a variety of materials, such as metal, plastic, a plastic/fiberglass composite, Plexiglas®, etc. For example, in one embodiment, the cover 26 is formed of Plexiglas mounted within a metal frame. Cutting box 28 may likewise be formed of such materials, or other materials, such as metal, presently preferred for durability, molded plastic, etc. For example, as seen in FIGS. 1-3, in one embodiment, cutting box 28 is formed of end walls 58 made of one-fourth inch steel plate, and side walls 60 made of 14 gauge sheet metal, end walls 58 and side walls 60 mounted within a metal frame 62 (FIG. 1) for mounting on a vehicle such as tractor 12. Further, it should be understood that walls 58 and 60 may be welded or fastened together in a variety of manners.

As seen in FIGS. 2-6, the cutting box 28 is generally dimensioned to accommodate a blade reel assembly 29 mounted therein. Blade reel 29 includes at least one, and preferably a plurality, of blades 30 arranged in a spiral or spiral-like configuration about an axle 31. For example, blade reel assembly 29 may be a 7-blade reel purchased from Kesmac Inc., d/b/a Brouwer Turf, of Dalton, Ohio. Blade reel 29 should be mounted in cutting box 28 in a manner to permit generally unimpeded rotation about the axle 31. Blades 30 may be mounted on discs 32 that in turn are mounted on axle 31. While blades 30 may be mounted on axle 31 in some other manner, it has been found, as discussed further below, that use of discs 32 creates multiple sub-chambers within interior chamber 24 for cutting leaves, thereby reducing risk of clogging, and channeling leaves more efficiently than would be possible without the discs 30. For example, such channeling may occur by causing leaves to be spread across the length of blades 30 so that cutting may occur relatively evenly and relatively continuously.

Figure 4:
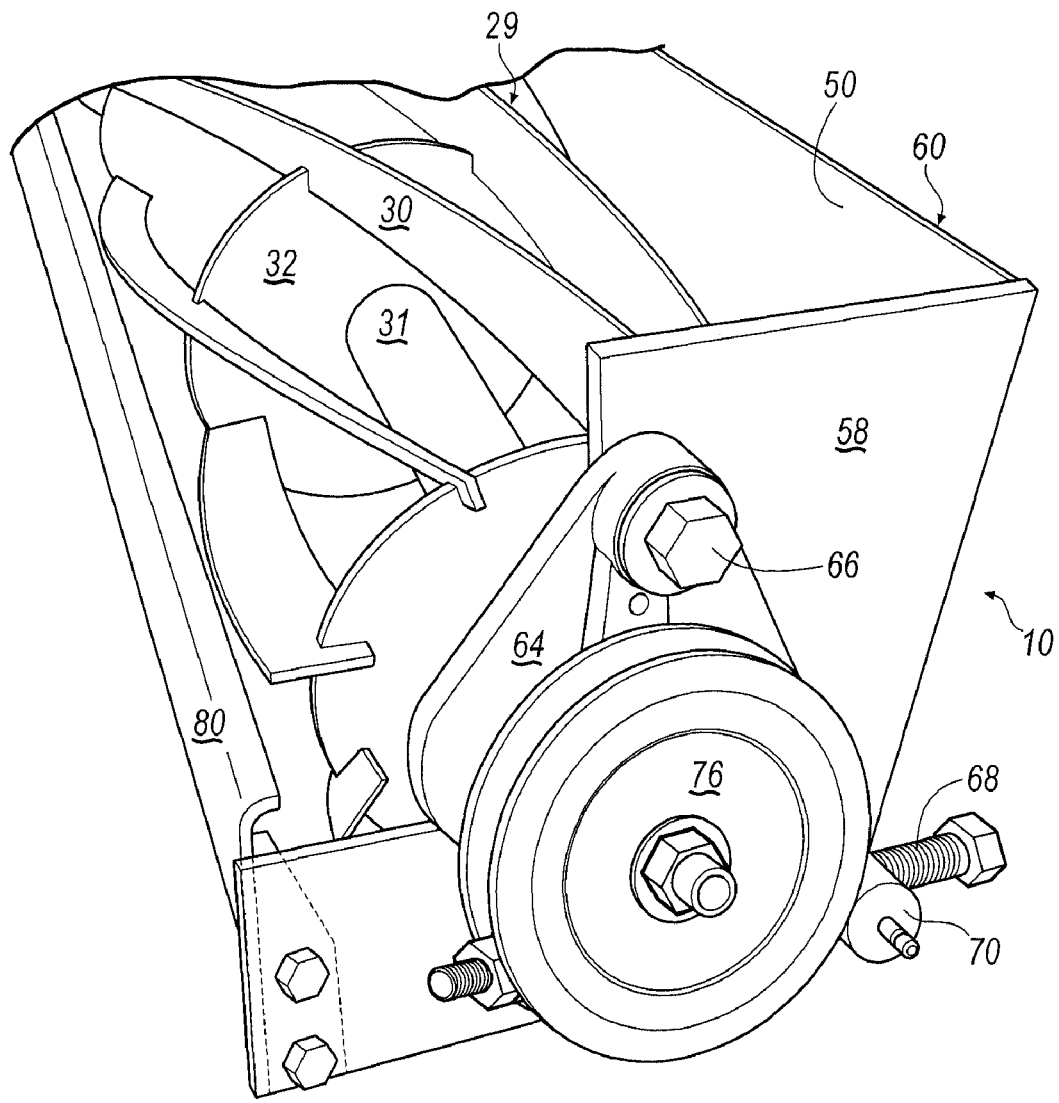
FIG. 4 is a top/side view of the leaf cutter of FIG. 1 with a side wall of the leaf cutter cut away to show a cutting bar.
Figure 5:
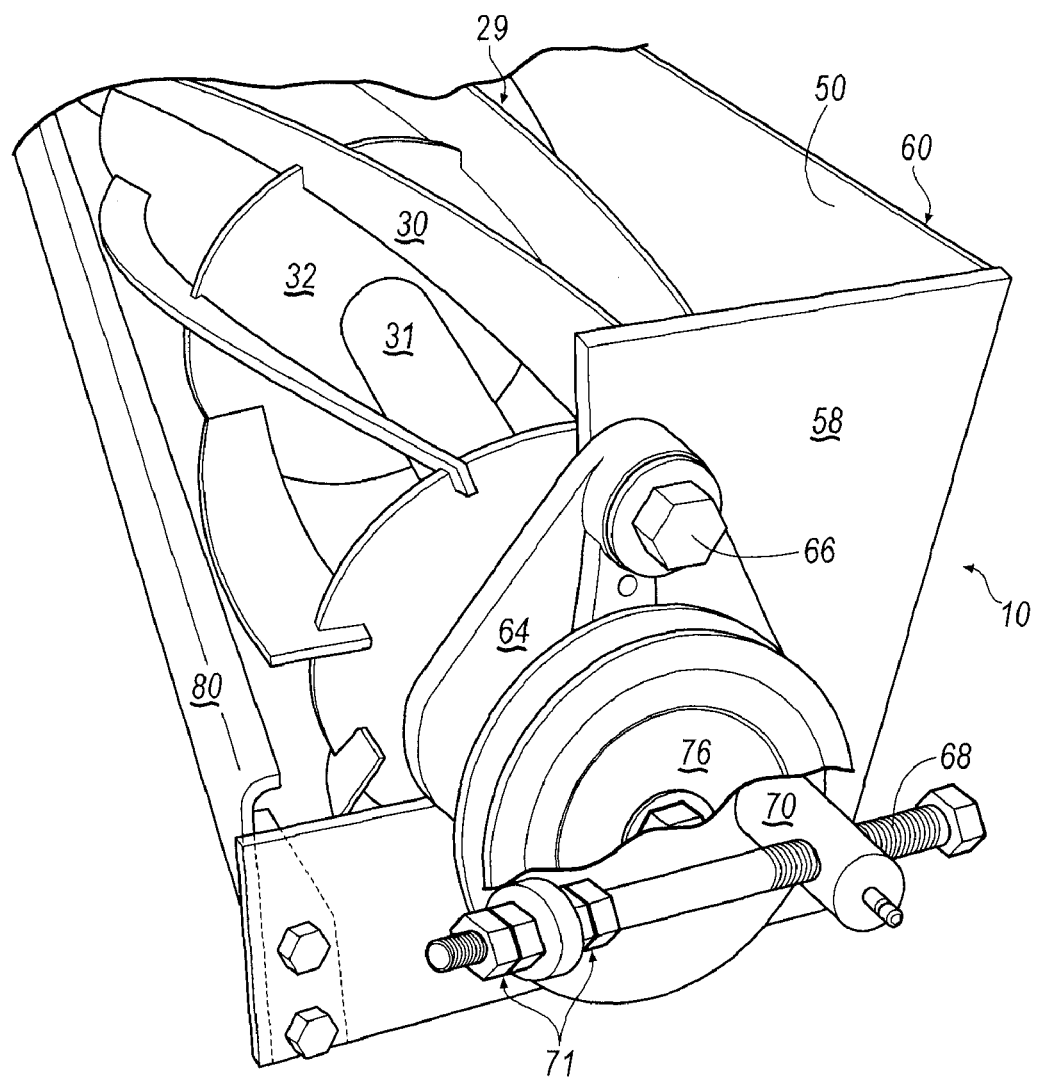
FIG. 5 is a top/side view of the leaf cutter of FIG. 1, with a side wall of the leaf cutter cut away to show a cutting bar, and also with a pulley cut away to show a reel adjustment mechanism.
Figure 8:
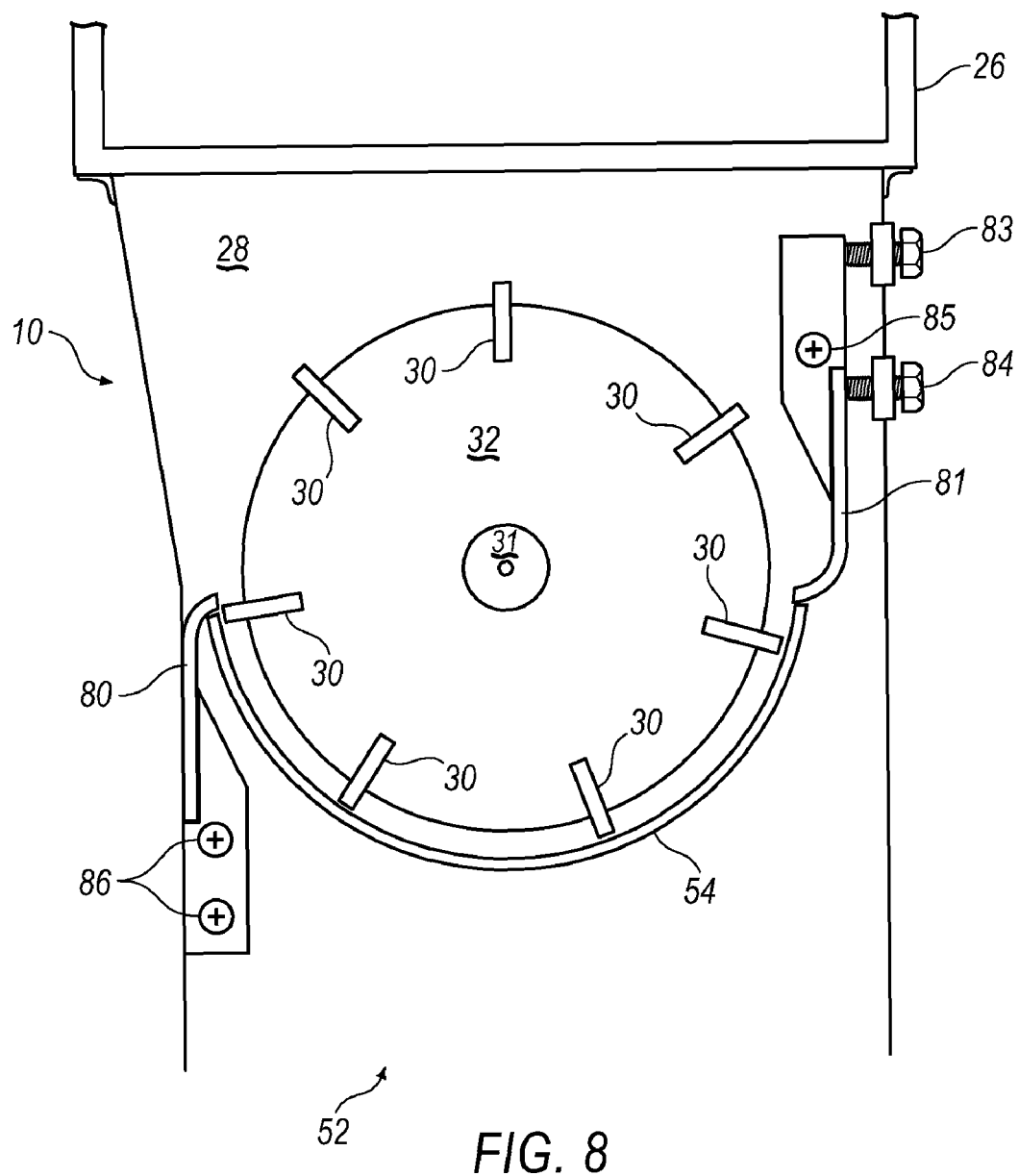
FIG. 8 is an end view of an exemplary embodiment of a leaf cutter including a first cutting bar and a second cutting bar.

As seen in FIGS. 4 and 5, discussed further below, blade reel assembly 29 generally includes a cutting bar 80 disposed adjacent to, but not quite touching, e.g., approximately one-sixteenth of an inch away, and possibly even closer, from a circumference formed by blades 30. Generally, an appropriate distance of blades 30 cutting bar 80 may be obtained by adjusting the blade reel 29 as discussed below. The blade reel 29 may be adjusted so that one or more blades 30 are actually touching the cutting bar 80, and then the blade reel assembly 29 may be adjusted so that blades 30 are not touching the cutting bar 80. Optimally, there should be no friction at all between the blades 30 and the cutting bar 80 in operation, until a leaf or the like comes between them, thereby cutting the leaf, etc. As shown in FIG. 8, more than one cutting bar 80 may be included in the cutting box 28.

Returning to FIGS. 1 and 2, a bottom opening 33 of the cover 26 is dimensioned to allow the cover 26 to rest atop the cutting box 28. Cover 26 may be affixed to cutting box 28 by hinges, bolts or other fasteners. It is generally desirable that cover 26 be openable with respect to, or even removable from, the cutting box 28 to allow for cleaning, maintenance of blade reel 29, removal of foreign matter and/or debris, etc. Making the cover 26 hingedly attached to the cutting box 28 facilitates opening of the leaf cutter 10 for maintenance, removal of foreign matter, replacement of parts, etc. Bottom edges of the cover 26 may be lined with plastic, foam, rubber, or some other flexible material to provide cover 26 with a substantially air-tight fit atop the cutting box 28.

A top side 34 of cover 26 is joined to plate 18 at an edge 36, and to an opposing edge 38 of cutting box 28. Thus, as can be seen in the figures, cover 26 top side 34 may have a rectilinear portion 40 and a curvilinear portion 42. For example, rectilinear portion 40 may slope toward cutting box 28 for roughly two-thirds of the length of cutting box 28, whereupon curvilinear portion 42 may slope over the remaining length of cutting box 28 at an increasing rate to meet edge 38. Although not shown in the figures, it is possible for cover 26 to have a substantially rectangular shape, including a side of a shape and size similar to the shape and size of plate 18. Cover 26 may be a variety of different shapes, so long as the cover 28 prevents leaves from exiting leaf cutter 10 until the leaves have been cut to a size small enough to fall through mesh screen 54 (shown in FIGS. 6-8). However, it has been found that a sloping top side 34 generally allows leaves to be better channeled toward blades of blade reel 29. Such slope of the cover 26 is presently greatly preferred to facilitate entry of leaves into the interior chamber 24 without leaves getting trapped in corners of the chamber 24. A sloped configuration to the cover 26 also helps properly channel and direct leaves when the leaves are thrown up against the cover 26 repeatedly during operation of the leaf cutter 10. For example, leaves may gather on a top side of baffle 44, and are then will fall down into the cutting chamber again.

As best seen in FIG. 2, inlet area 22 is generally formed by a baffle 44 that separates the inlet area 22 from a remainder of interior chamber 24. The baffle 44 is generally flat, i.e., planar, and may be formed of materials such as those mentioned above with respect to cover 26, e.g., Plexiglas, metal, plastic, etc. A rectilinear end of baffle 44 is affixed, e.g., using silicon caulk or some other adhesive or fastening mechanism, to the top edge 36 of plate 18. The baffle may also be affixed to other portions of the interior of cover 26. A concavely-shaped curvilinear end 46 of baffle 44 includes side tabs 48 that, when cover 26 is closed, are generally adjacent to or resting against interior faces 50 of side walls 60 of cutting box 28. However, the baffle 44, including tabs 48, is generally not attached to the interior faces 50 so as to allow the baffle 44 to move with cover 26 when it is opened or removed from cutting box 28. The curvilinear shape of end 46 may be generally circular and in any event end 46 is generally disposed to partially encircle or encompass blade reel 29, without actually touching any of blades 30.

Figure 6:
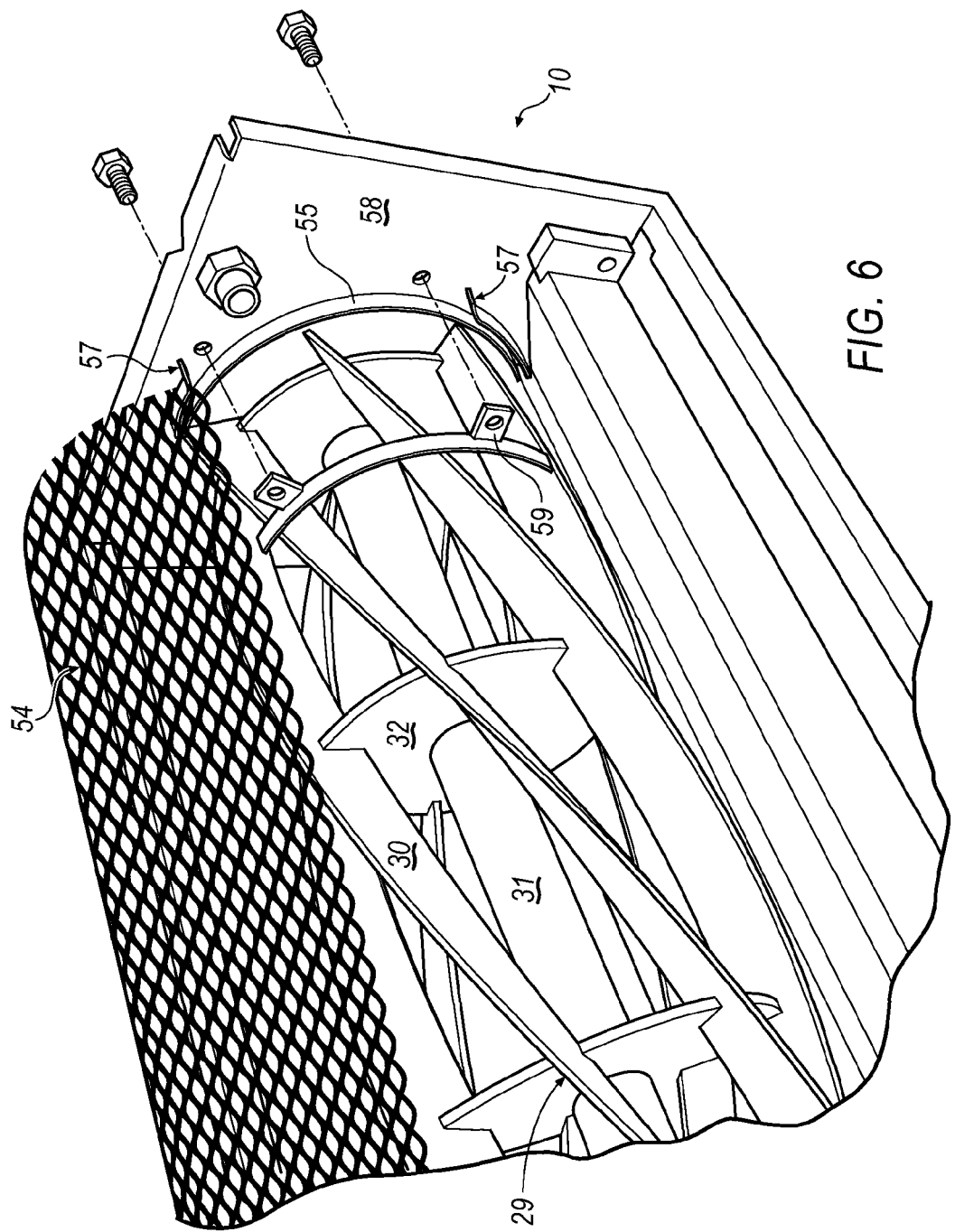
FIG. 6 is a bottom view of a portion of the leaf cutter of FIG. 1, illustrating the placement of a mesh screen beneath reel blades of the leaf cutter.
Figure 7:
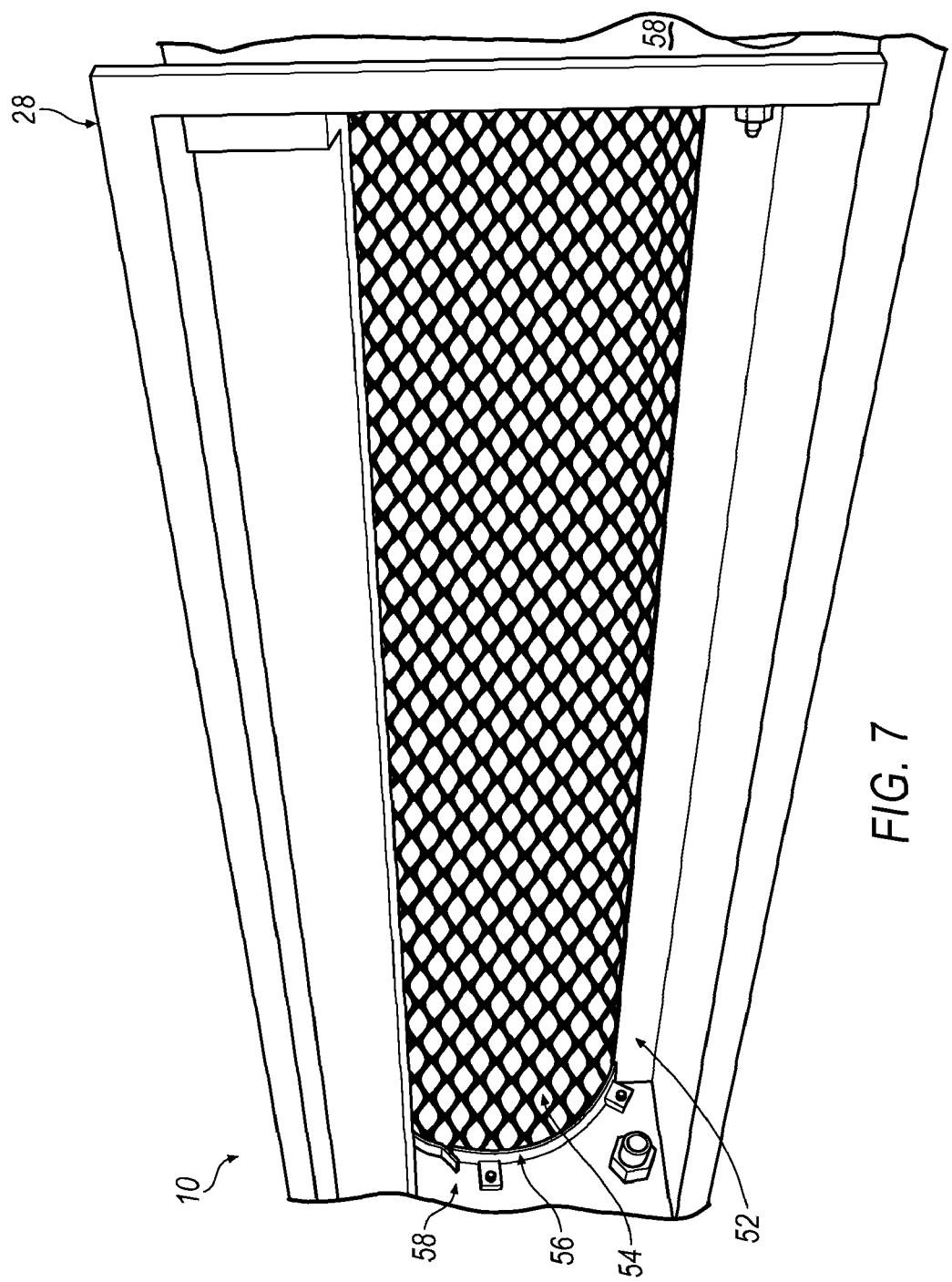
FIG. 7 is a bottom perspective view of the leaf cutter of FIG. 1.

As best seen in FIG. 7, a bottom opening 52 of interior chamber 24 is located at a bottom of cutting box 28. The bottom opening 52 is generally covered by a removable mesh screen 54, which is held in place by a two sets of curvilinear lips 56. Referring now also to FIG. 6, each set of lips 56 includes an inner lip 55 and an outer lip 59, the lips 55 and 59 extending orthogonally from end walls 58 (only one set of lips 56 is visible in each of FIGS. 6-7). For example, lips 56 may extend from end walls 58 for approximately one-half inch. The lips 56 in a set are generally a distance apart from one another to accommodate the thickness of mesh screen 54 with a minimal amount of, or preferably no, play. As best seen in FIGS. 5 and 6, lips 56 generally curve so as to allow mesh screen 54 to be placed close to, but not touching, blades 30. For example, in one embodiment, lips 56 are configured so that mesh screen 54 will be approximately one-sixteenth of an inch from blades 30, or closer, if possible without blades 30 actually touching or scraping mesh screen 54.

To allow for insertion and replacement of mesh screen 54, one or both of the lips 56 may be removable. For example, referring now to FIG. 6, tabs 57 may be included in a lip 56 to facilitate insertion and removal of a screen 54, e.g., when the screen is worn, when a different size of mesh is desired, etc. Tabs 57 generally protrude outwardly from the otherwise generally circumferential shape of a lip 56 to guide the curved mesh screen 54 into place against an opposing inner lip 55. Then, a removable outer lip 59 may be bolted in place, or otherwise fastened to end wall 58, to hold mesh screen 54 in place proximate to blades 30.

Mesh screen 54 should be of a thickness sufficient to accommodate the wear of leaf cutter 10, yet not so thick as to resist being made into a curved formation or held in place by lips 56. For example, in one embodiment, mesh screen 54 is a fourteen gauge (or roughly 0.0747 inch thick) metal screen. Further, in one embodiment, mesh screen 54 has openings that are roughly three-fourths inch long and five-sixteenths inch high substantially in a diamond shape. However, mesh screen 54 may have openings of varying sizes to accommodate cutting leaves to various sizes, and therefore larger or smaller openings are possible, and contemplated.

Turning now to FIGS. 3-5, pulley mount 64 is attached to one the cutting box end walls 58 by a pivot bolt 66. An adjustment screw 68 is threaded through an anchor nut 70 that is affixed to the end wall 58. Nuts 71, seen in FIG. 5, are locked in place by lock washers (not shown) so than turning the screw 68 moves blades 30 closer to, or further from, cutting bar 80, depending on the direction in which the screw 68 is turned.

Axle 31 extends through pulley mount 64 to attach to pulley 76. An engine 78 (FIG. 1) may be used to turn the pulley 76, thereby turning axle 31 and blade reel 29, whereby leaves may be cut or shredded in a scissors-like fashion when they fall between blades 30 and a cutting bar 80. The engine 78 may be a gasoline engine, electric motor, or other engine or motor suitable for turning axle 31. For example, in one embodiment, engine 78 is a 6.5 horsepower gasoline engine. In operation of leaf cutter 10, cover 26 traps leaves in the interior chamber 24 until leaves are cut finely enough to fall through openings in mesh screen 54, generally forced by air pressure from hose 14 and pipe 16 and/or gravity.

As best seen in FIGS. 4 and 5, cutting bar 80 extends the length of cutting box 28, and is bolted to respective end walls 58. As mentioned above cutting bar 80 is generally part of blade reel assembly 29, but could be provided separately. Cutting bar 80 provides for scissors-like cutting action when placed proximate to, but not touching, e.g., approximately one-sixteenth of an inch, or less, away from, a circumference formed by blades 30.

As shown in FIG. 8, in addition to a first cutting bar 80, a second cutting bar 81 could be deployed to more quickly and/or efficiently cut leaves. In embodiments that include two cutting bars 80 and 81, adjustments of distance of at least one of the cutting bars 80 and 81 would have to be made by mechanical tilting of the cutting bar 80 or 81, rather than by adjusting a location of blade reel assembly 29 with adjustment screw 68. For example, as seen in FIG. 8, a first cutting bar 80 may bolted in place, e.g., to end walls 58, with bolts 86 and held stationary, while a second cutting bar 81 may be bolted in pace with a pivot bolt 85. A position of the second cutting bar 81 may then be adjusted relative to the blade reel assembly 29 by adjusting one or both of adjustment screws 83 and 84.

Returning to FIG. 1, a leaf bag 90 is generally disposed beneath cutting box 28. Many commercially available leaf bags may be used as leaf bag 90, so long as the leaf bag is sufficiently closely woven to contain cut leaves, but can "breath" to allow air to escape as leaves are blown into the bag, thereby preventing an unacceptable level of pressure from building up inside the bag 90. Leaf bag 90 may be affixed to frame 62, e.g., by Velcro® or some other fastening mechanism, or may be otherwise fastened to cutting box 28.

In operation, mowing blades or a blowing mechanism of lawn tractor 12 is engaged to send leaves from mowing chamber 15 through hose 14 and pipe 16 into inlet area 22. Mowing blades in mowing chamber 15 may somewhat cut or chop leaves, but in conjunction with the leaf cutter 10 the primary function of mowing blades is to create pressure moving leaves through the pipe 14. Engine 78 is engaged to axially rotate blade reel 29 about axle 31. As leaves enter inlet area 22, they fall into an end of cutting box 28 covered by baffle 44. The leaves are cut, or scissored, when they fall between blades 30 and cutting bar 80. Further, as leaves engage with blade reel 29, they migrate toward the end of cutting box 28 not covered by baffle 44. Leaves are repeatedly cut until leaf pieces are of size small enough to fall through mesh screen 54 due to the force of gravity and/or air pressure from hose 14 and pipe 16, where they are collected in bag 90. However, once leaves are in the cutting box 28, gravity alone, even in the absence of air pressure, is generally sufficient to force leaves through mesh screen 54. Thus, the leaf cutter 10 could be operated without tractor 12, hose 14, pipe 16, etc.

The above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed apparatus, systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

I claim:

1. An apparatus, comprising:
    a cover defining an interior chamber, the cover comprising a top and an end plate having an inlet opening;
    a cutting box, the cover being mounted on the cutting box;
    a blade reel assembly within the cutting box, the blade reel assembly including at least one blade, and being configured to rotate about an axle, thereby defining a circumference;
    a generally planar baffle attached at a top end to an edge defined by the end plate and the top of the cover, wherein the baffle is adjacent at a bottom end to at least one side wall of the cutting box, and further wherein the bottom end of the baffle is curvilinear, and at least partially encompasses the circumference of the blade reel assembly;
    a cutting bar disposed proximate to the circumference of the blade reel assembly; and
    a mesh screen disposed beneath the blade reel assembly, proximate to the circumference of the blade reel assembly.

2. The apparatus of claim 1, wherein at least a portion of the top is curvilinear.

3. The apparatus of claim 2, further comprising an inlet pipe attached to the end plate so as to cover the inlet opening, the inlet pipe having an opening substantially matching the inlet opening.

4. The apparatus of claim 1, the cutting box further comprising two end walls, each of the end walls having a set of lips affixed thereto, each set of lips including an outer lip and an inner lip, the lips configured for holding the mesh screen in place beneath the blade reel assembly.

5. The apparatus of claim 4, each set of lips being curvilinear to at least partially encompass the circumference of the blade reel assembly.

6. The apparatus of claim 5, wherein the outer lip is removable to allow the mesh screen to be inserted or replaced.

7. The apparatus of claim 1, further comprising a plurality of discs mounted on the axle and supporting the at least one blade, the plurality of discs including at least two intermediate discs disposed between a first end disc and a second end disc.

8. The apparatus of claim 1, wherein the at least one blade is a plurality of blades.

9. The apparatus of claim 1, further comprising an adjustment mechanism configured to allow adjustment of a distance of the cutting bar from the circumference defined by the at least one blade.

10. The apparatus of claim 1, further comprising a pulley mounted on an end of the axle, and an engine drivably connected to the pulley.

11. The apparatus of claim 1, further comprising a leaf bag attached to the cutting box in a configuration for catching leaves falling through the mesh screen.

12. The apparatus of claim 1, wherein the apparatus is mounted on a vehicle.

13. The apparatus of claim 1, wherein the cutting bar is a distance that is approximately one-sixteenth of an inch from the circumference of the blade reel assembly.

14. The apparatus of claim 1, wherein the mesh screen is a distance that is approximately one-sixteenth of an inch from the circumference of the blade reel assembly.

15. The apparatus of claim 1, further comprising a second cutting bar disposed adjacent to the circumference of the blade reel assembly.

16. The apparatus of claim 15, further comprising an adjustment mechanism that allows adjustment of a distance between the second cutting bar and the circumference of the blade reel assembly.

17. The apparatus of claim 1, wherein the baffle includes two side tabs configured to be adjacent to respective interior faces of the cutting box.

18. The apparatus of claim 1, wherein the baffle is mounted transversely with respect to the axle.

19. The apparatus of claim 1, wherein the baffle, the blade reel assembly, and the end plate form an inlet chamber.

20. The apparatus of claim 19, wherein the inlet chamber is substantially triangular.

* * * * *